April 19, 1960    G. A. LYON    2,933,346
WHEEL COVER
Filed March 26, 1956
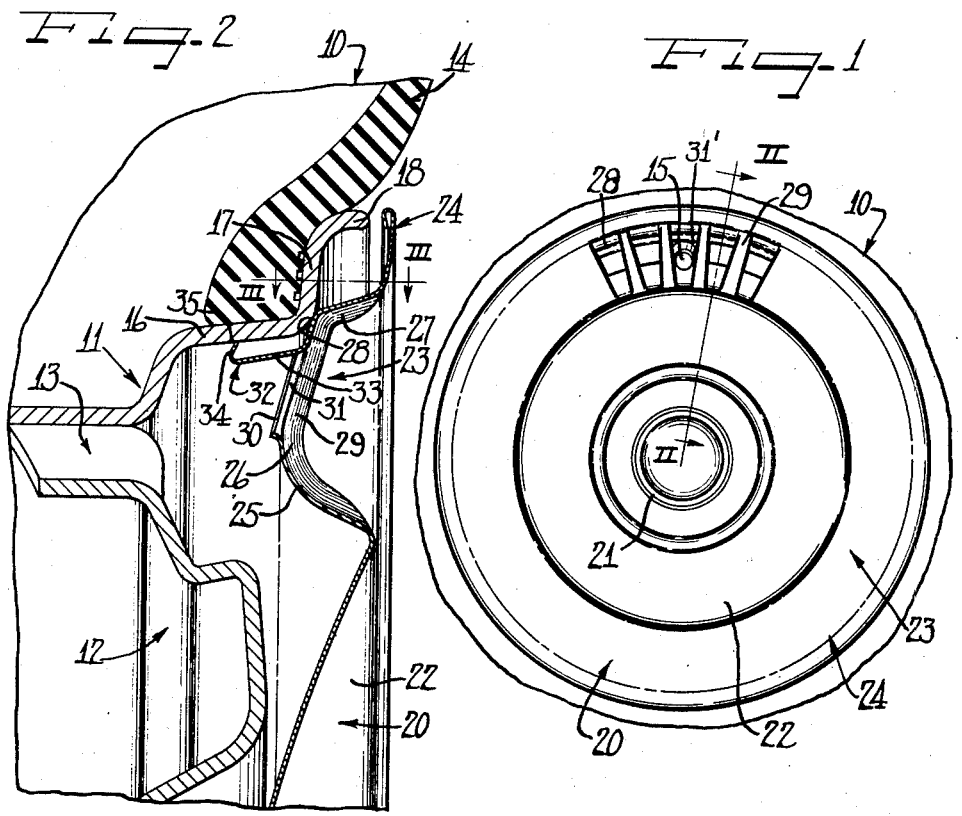
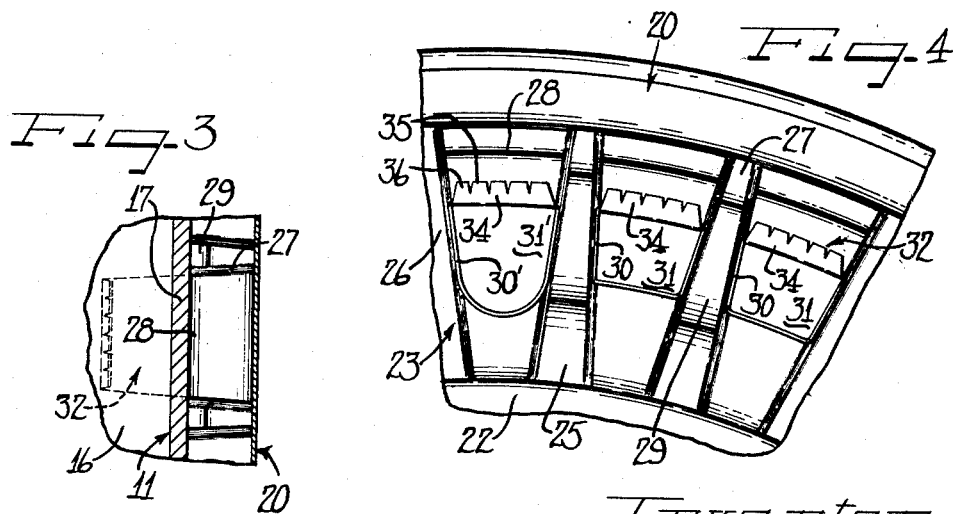
Inventor
George Albert Lyon

United States Patent Office 2,933,346
Patented Apr. 19, 1960

2,933,346
WHEEL COVER
George Albert Lyon, Detroit, Mich.

Application March 26, 1956, Serial No. 573,860

11 Claims. (Cl. 301—37)

This invention relates generally to a wheel structure and more particularly to a new and improved cover construction and its manner of cooperation with a vehicle wheel.

The instant cover is of the type having an annular dished portion provided with circumferentially spaced generally radially extending depressed areas. Alternating with the depressed areas are rib portions defining radial channels. When the cover is to be assembled on a vehicle wheel, the depressed areas are adapted to bottom against the junction of axial and radial rim flanges with the cover having means to maintain same in retained engagement upon the wheel.

When the cover or more particularly the depressed areas are in bottomed engagement with the rim, the centrifugal forces set up when the wheel is in rotation allows dirt and other foreign matter to be forcefully ejected radially outwardly through the radial channels away from the wheel. No longer will dirt tend to cake up at the junction of the cover with the tire rim and, therefore, in assembly the cover and wheel are maintained in a dirt-free balanced relation.

Accordingly, an object of this invention is to provide a new and improved wheel cover having a particular construction by which the cover may be maintained on the wheel in substantially dirt-free balanced relationship.

Another object of this invention is to provide a new and improved cover construction having air cooling means adapted to scoop up air and direct the same through wheel openings onto the brake area of the wheel.

Yet another object of this invention is to utilize the material which is struck out to form openings in providing retaining extensions.

Still another object of this invention is to provide a new and improved cover construction which is highly efficient in operation upon a vehicle wheel, and which lends itself to being produced on a large production scale in an economical manner.

Other objects and features of the present invention will more fully become apparent in view of the following description taken in conjunction with the accompanying drawing and illustrating therein a single embodiment and in which:

Figure 1 is a side elevation of my wheel structure;

Figure 2 is an enlarged fragmentary cross sectional view taken substantially on the line II—II of Figure 1 looking in the direction indicated by the arrows;

Figure 3 is an enlarged view partly in cross section taken substantially on the line III—III of Figure 2 looking in the direction indicated by the arrows; and Figure 4 is an enlarged fragmentary rear elevation of my cover.

As shown on the drawings:

The reference numeral 10 indicates generally a wheel structure including a stepped multi-flanged tire rim 11 which is carried on a more or less conventional body part 12. The body part 12 has a bolt-on flange (not shown) by which the wheel may be maintained by bolts and the like in assembly with an axle of an automobile vehicle or the like. At circumferentially spaced intervals generally at the junction of the tire rim and body part are wheel openings 13 which open axially rearwardly onto the brake drum area of the wheel (not shown). Mounted upon the stepped tire rim is a conventional tire assembly 14 which may be either a tube or tubeless type and is adapted to be inflated by means of a valve stem 15 (Figure 1).

The tire rim 11 includes a generally axially extending intermediate flange 16 which is connected at its axially outer end to a generally radially outwardly extending flange 17 which in turn terminates in a terminal flange 18.

Carried on the outer side of the wheel 10 is my novel wheel cover 20 embodying features of the present invention. The cover 20 may be made from any suitable material such as stainless steel sheet and may be struck out as a metal stamping. The cover 20 includes a central crown 21, an intermediate concave portion 22, an annular dished portion 23 and an outer cover margin 24 which is in spaced overlying relation to the terminal rim flange 18.

The dished portion 23 includes a generally axially inwardly radially outwardly extending portion 25, a generally radially and axially outwardly extending portion 26, and a generally radially and axially outwardly extending portion 27 which merges with the outer margin 24. Provided in the dished portion 23 at circumferentially spaced intervals are depressed portions 28. Alternating with the depressed portions 28 are rib portions 29 defining radially extending channels.

Struck out from each of the depressed areas or portions 28 is an axially inwardly extending continuous flange 30. It will be noted the flange 30 defines the periphery of an opening 31 which is in generally axial alignment with the wheel opening 13 (Figure 2).

These openings 31 facilitate in directing cooling air streams into the wheel openings 13 to cool the brake drum structure.

A portion of the metal struck out from a suitable number of openings 31 has been utilized and worked into retaining means or extensions 32 which are adapted to retainingly maintain the cover 20 on the wheel 10. The retaining means 32 includes a relatively resilient generally axially extending flange 33 and a short stiff terminal 34 having a gripping edge 35 for biting into the intermediate rim flange 16.

As will be noted in Figure 4, each of the retaining extensions 32, and more particularly the short legs 34 are cut to provide a series of extremities 36 each having a terminal biting edge 35.

Each of the depressed areas 28 and the rib portions 29 extend substantially the full dimension of the dished portion 23, in other words, they are substantially co-extensive in length with the dished cover portions 25, 26 and 27. When the cover 20 is in assembly upon the wheel, each of the depressed areas 28 is adapted to bottomly engage against the tire rim and more particularly against the junction of the tire rim flanges 16 and 17. When the depressed areas 28 are in bottomed engagement against the wheel the channeled rib portions 29 define passageways having access radially outwardly of the cover and wheel.

The cover is assembled upon the wheel by initially centering the valve stem 15 with opening 31' in the cover defined by flange 30'. The flange 30' and opening 31' are of a slightly elongated dimension relative to the other flanges and openings 30 and 31 to accommodate the valve stem 15. After the cover has been centered on the wheel and upon the application of an axial force the retaining extensions 32 are flexed into biting engagement with the tire rim. This action is brought about since the retaining extensions are arranged in a common circle of a normally slightly larger diameter than the inner diameter of the rim flange 34.

When the retaining extensions are in biting engagement with the rim, the cover is in retained engagement upon the wheel and ordinarily cannot be removed unless a screw driver or the like is inserted underneath the outer margin 24 of the cover 20, and upon a twisting of the screw driver the cover may be forceably ejected from the wheel.

By virtue of the present cover construction, when the wheel is rotated dirt, water and other foreign particles such as gravel may be urged by the centrifugal forces set up by the wheel radially outwardly and discharged through the passageways or grooves formed by the channeled rib portions 29 to the outside or exterior of the cover and wheel assembly. This construction prohibits the accumulation of dust and dirt generally at the junction where the depressed areas are bottomed against the tire rim and minimizes any likelihood of the cover and wheel becoming imbalanced due to excessive accumulation of dirt and the like.

It will be understood that modifications and variations may be effected without departing from the scope of the novel concepts of the present invention.

I claim as my invention:

1. In a wheel structure, a wheel including rim and body parts, a wheel cover member for overlying retained engagement upon the wheel having an annular dished intermediate portion provided with a series of generally radially outwardly extending ribs for bottomed engagement on the wheel, said ribs providing a radially extending channeled area on the axially inner side thereof with the channeled area defining passageways by which the centrifugal action of the wheel can forcefully eject dirt particles radially outward therethrough, cover areas between said ribs with at least some of said cover areas provided with cover member openings each defined by an edge, at least some of said openings having the cover material removed to form said openings providing resiliently deflectable fingers, the fingers having deflectable edges extended into resilient snap-on, pry-off retaining extensions cooperable with the wheel to retain said cover member thereon.

2. In a wheel structure, a wheel including rim and body parts, a wheel cover member for overlying retained engagement upon the wheel having an annular dished intermediate portion provided with a series of generally radially outwardly extending ribs for bottomed engagement on the wheel, said ribs providing a radially extending channeled area on the axially inner side thereof with the channeled area defining passageways by which the centrifugal action of the wheel can forcefully eject dirt particles radially outward therethrough, cover areas between said ribs with at least some of said cover areas provided with cover member openings each defined by an edge, at least some of said openings having the cover material removed to form said openings providing resiliently deflectable fingers, the fingers having deflectable edges extended into resilient snap-on, pry-off retaining extensions cooperable with the wheel to retain said cover member thereon, said parts having at circumferentially spaced intervals wheel openings with said cover member openings being arranged in generally axial alignment therewith to facilitate cooling the wheel.

3. In a wheel structure, a wheel including a stepped multi-flange rim, a wheel cover member for overlying retained engagement upon the wheel having an annular dished intermediate portion provided with a series of generally radially extending depressed portions for bottomed engagement on the rim, a radially extending channeled portion between each of said depressed portions defining passageways through which dirt can escape out from underneath said cover member, each of said depressed portions provided with an opening arranged in a common circle and each defined by an edge, at least some of the cover material removed to form the openings providing resilient snap-on, pry-off retaining extensions to retainingly cooperate with the rim.

4. In a wheel structure, a wheel including rim and body parts and having circumferentially spaced wheel openings, a wheel cover member in overlying retained engagement upon said wheel having an annular dished intermediate portion provided with a series of generally radially outwardly extending depressed portions in bottomed engagement on said wheel, a radially extending channeled portion between each of said depressed portions each defining a radial passageway on the rear side of the cover by which the centrifugal action of said wheel can forcefully eject dirt particles radially outward therethrough, each of said depressed portions provided with a cover member opening defined by a peripheral edge through which air is projected through said wheel openings to cool said wheel, at least some of the cover material removed to form the openings providing resilient snap-on, pry-off retaining extensions in cooperation with said wheel to retain said cover member thereon.

5. In a wheel structure, a wheel including rim and body parts, a wheel cover member for overlying retained engagement upon the wheel having an annular dished intermediate portion provided with a series of generally radially outwardly extending depressed areas for bottomed engagement on the wheel, a radially extending channeled portion between each of said depressed areas each defining a radial passageway on the inner side of the cover by which the centrifugal action of the wheel can forcefully eject dirt particles radially outward therethrough, and means to retain said cover member upon the wheel.

6. In a wheel structure, a wheel including a multi-flanged stepped rim including a generally axially extending intermediate flange rim portion and a stepped terminal flange rim portion having a common junction, a wheel cover member in overlying retained engagement upon said wheel having an annular dished intermediate portion provided with a series of generally radially outwardly extending areas in bottomed engagement on the junction, a radially extending channeled portion between each of said areas each defining a radial passageway on the inner side of the cover by which the centrifugal action of said wheel can forcefully eject dirt particles radially outward therethrough, said cover member having an outer annular margin in axially spaced relation to said terminal flange rim portion to permit ejected dirt particles to escape radially of said cover member.

7. In a wheel structure including a wheel having a stepped multi-flanged tire rim part and a body part, a cover member for overlying disposition upon the wheel and having retained means to retain the cover upon the wheel, said cover having a radial cover portion provided with radially extending portions alternating with channeled portions, said radially extending portions being in bottomed engagement on the stepped multi-flanged tire rim part with said channeled portions defining passageways through which dirt may be ejected radially outwardly between the tire and said cover to prevent caking of dirt at the junction of said rib-like portions with the tire rim part.

8. In a wheel structure including a wheel having a stepped multi-flanged tire rim part and a body part with circumferentially spaced wheel openings in the wheel, a cover member for overlying disposition upon the wheel, and having retaining means to retain the cover upon the wheel, said cover having a radial cover portion provided with radially extending portions alternating with channeled portions, said radially extending portions being in bottomed engagement on the stepped multi-flanged tire rim part with said channeled portions defining passageways through which dirt may be ejected radially outwardly between the tire and said cover to prevent caking of dirt at the junction of said radially extending portions with the tire rim part, said radially extending portions having openings therein in generally axial alignment with the wheel openings to allow air to be circulated therethrough and into the wheel openings.

9. In a wheel structure including a wheel having a stepped multi-flanged tire rim part and a body part with circumferentially spaced wheel openings in the wheel, a cover member for overlying disposition upon the wheel and having retaining means to retain the cover upon the wheel, said cover having a radial cover portion provided with radially extending depressed portions alternating with channeled portions, said depressed portions being in bottomed engagement on the stepped multi-flanged tire rim part with said channeled portions defining passageways through which dirt may be ejected radially outwardly between the tire and said cover to prevent caking of dirt at the junction of said depressed portions with the tire rim part, said depressed portions having struck out openings therein in generally axial alignment with the wheel openings with the cover material struck out providing wheel engaging retaining extensions.

10. In a wheel structure, a wheel including a multi-flanged stepped rim including a generally axially extending intermediate flange rim portion and a stepped terminal flange rim portion having a common junction, a wheel cover member in overlying retained engagement upon said wheel having an annular dished intermediate portion provided with a series of generally radially extending areas confronting the junction, a radially extending channeled portion between each of said areas each defining a radial passageway on the inner side of the cover by which the centrifugal action of said cover can forcefully eject dirt particles radially outward therethrough, the cover member having an annular outer margin in axially spaced relation to said terminal flange rim portion to permit ejected dirt particles to escape radially of said cover member, and resiliently deflectable retaining extensions provided on the underside of the cover sustaining the cover in assembly on the wheel and with the channeled areas and the annular outer margin being sustained in spaced relation to the wheel.

11. In a wheel structure, a wheel including a multi-flanged stepped rim including a generally axially extending intermediate flange rim portion and a stepped terminal flange rim portion having a common junction, a wheel cover member in overlying retained engagement upon said wheel having an annular dished intermediate portion provided with a series of generally radially extending areas confronting the junction, a radially extending channeled portion between each of said areas each defining a radial passageway on the inner side of the cover by which the centrifugal action of said cover can forcefully eject dirt particles radially outward therethrough, the cover member having an annular outer margin in axially spaced relation to said terminal flange rim portion to permit ejected dirt particles to escape radially of said cover member, and resiliently deflectable retaining extensions provided on the underside of the cover sustaining the cover in assembly on the wheel and with the channeled areas and the annular outer margin being sustained in spaced relation to the wheel, the radially extending areas being disposed axially inwardly of the channeled portion and with at least some of the areas having cover openings with the cover material removed to form said openings providing said extensions, the channeled portions additionally functioning to reinforce the cover openings on its circumferentially opposite sides to resist distortion of the cover about the cover openings.

References Cited in the file of this patent

UNITED STATES PATENTS

| | | |
|---|---|---|
| D. 171,803 | Lyon | Jan. 19, 1954 |
| 2,127,600 | Hunt | Aug. 23, 1938 |
| 2,312,568 | Lyon | Mar. 2, 1943 |
| 2,544,705 | Lyon | Mar. 13, 1951 |